Dec. 2, 1952 J. H. JACOBSON 2,619,884
JOINT FOR CONCRETE SLABS AND THE LIKE
Filed July 21, 1949
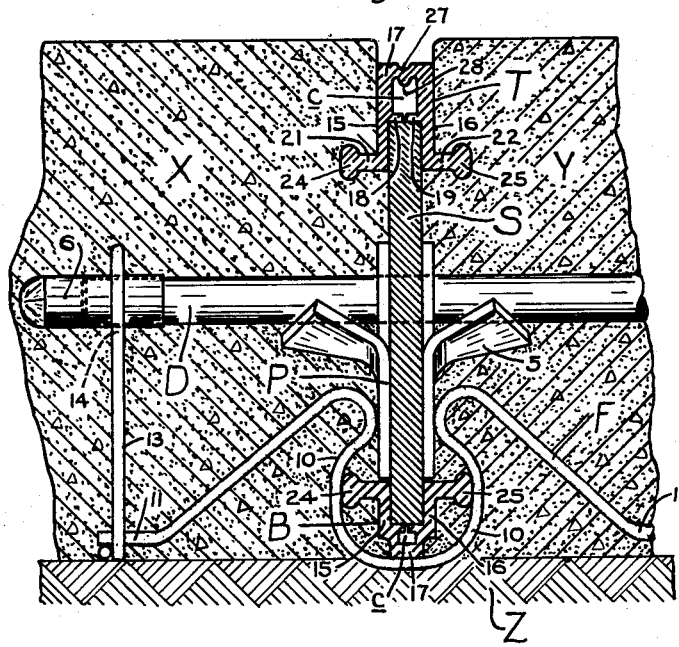
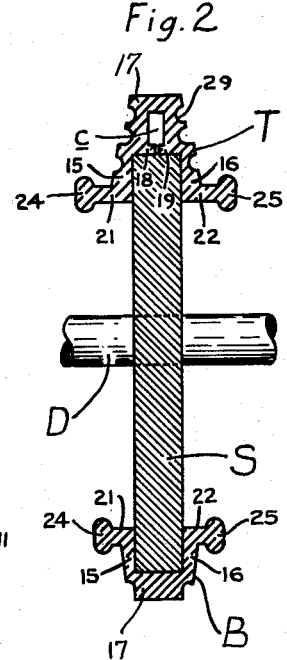
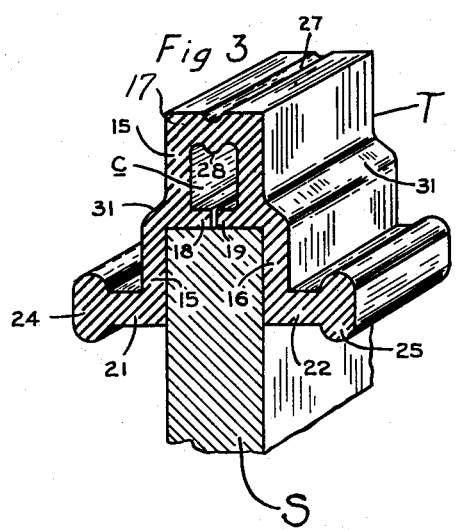
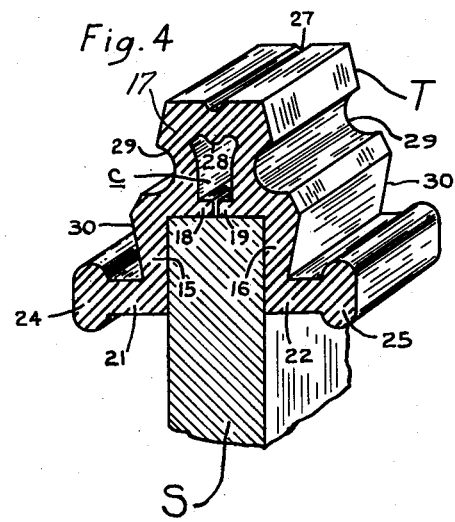
INVENTOR.
JAMES H. JACOBSON
BY
ATTY'S Patented Dec. 2, 1952

2,619,884

UNITED STATES PATENT OFFICE 2,619,884

JOINT FOR CONCRETE SLABS AND THE LIKE

James H. Jacobson, Chicago, Ill.

Application July 21, 1949, Serial No. 105,972

3 Claims. (Cl. 94—18)

This invention relates to improvements in expansion joints designed for use with Portland cement, monolithically poured, flat slab constructions and the like, and which when placed between adjacent slabs will compensate for their relative opposed lateral movements while maintaining an effective connection between them. It also will permit independent and relative vertical movements of the slabs, and maintain a seal within the space therebetween so as to prevent the possible entrance of foreign matter, such as water and inert material.

It is an object of this invention to provide a new and improved joint assembly which is both yieldable and resilient and which comprises a seal which is fixedly keyed with the adjacent slabs together with a supporting member therefor of compressible material which lies between the adjacent slabs and serves as a spacer therefor.

A further object of my present invention is to fixedly install a preformed sealing strip of plastic material having properties of rubber or the like, between adjacent concrete slabs to provide therebetween a permanent seal whose effectiveness will continue without impairment under varying seasonal and service conditions.

It is a further object of this invention to devise for installation between adjacent concrete slabs a joint assembly whose parts can be simply assembled and secured together on the job site. The components of such a joint assembly are so configured and constructed as to fit together and mutually cooperate in forming and protecting the confronting faces of the slabs on opposite sides of the joint.

It is also an object of this invention to provide a spacer member comprised in the joint assembly which will withstand the weight of concrete against its sides during the pouring operation, and which will maintain the required compressible space between the adjacent slabs of concrete.

A further object of this invention is to provide a strip of preformed rubber or the like at the base of the joint to prevent infiltration of subgrade material and moisture. In addition, means is provided for positioning such sealing strips in proper relation to the top and bottom surfaces of the pavement regardless of its thickness.

A further object is to provide means operating through the various joint configurations for supporting load transfer devices which serve the function of keeping the adjoining slabs relatively aligned, for maintaining the sealing strips correctly positioned with respect to such load transfer devices, and for permitting a free and even lateral movement of the sealing strips with a minimum of vertical motion.

It is also an object of this invention to provide means for maintaining the joint assembly components in alignment and for installing the joint assembly properly between the road forms and the subgrade. By utilizing component parts which are assembled on the job, a substantial saving in handling and shipping expense is achieved; also since the parts may be selected and assembled into the precise structure desired, no surplus stock of joints need be completed, carried on hand, or shipped to the job, to meet such widely varied conditions. The sealing strips may be furnished in relatively long lengths to be cut into shorter pieces of the requisite size, when received at the site.

Various other objects and advantages, as will hereinafter appear, are achieved by the joint of my invention of which certain embodiments are illustrated in the accompanying drawings in the manner following:

Figure 1 is a transverse section through my improved sealed joint between adjacent slabs of concrete or the like;

Fig. 2 is an end elevation of a spacer-seal assembly comprising top and bottom sealing strips each differing in form from the other and from the seal of Fig. 1;

Fig. 3 is a fragmentary perspective view looking toward one end of a spacer member assembled with a top sealing strip of still different form; and Fig. 4 which is view similar to Fig. 3 shows a sealing strip which is specifically different in form from those elsewhere illustrated.

Referring first to Fig. 1, I have here shown an expansion joint adapted for use between adjacent slabs X and Y of concrete or the like which are based upon a suitable subgrade Z. These slabs are poured on opposite sides of the joint assembly which includes a spacer member S to whose opposite edges are fitted top and bottom sealing strips T and B respectively. Each strip is produced from rubber, natural or synthetic, or some rubber-like material capable of forming a seal for the joint wherein it is installed, and having the property of resiliency so as to stretch outwardly or yield inwardly as the joint contracts or expands in response to changing conditions, such as thermal fluctuations.

The joint assembly may also include a plurality of load transfer dowels D each extended through the spacer member and through a pair of oppositely positioned bearing plates P one at each side of the spacer member, and each provided with obliquely extending ears 5 for embedment within the surrounding concrete. The end portions of each dowel extend into the adjacent slabs of concrete X and Y for anchorage therein. Over one end of each dowel is slidingly fitted a cap 6 maintained outwardly therefrom a minimum distance by a suitable stop, the cap and dowel being free to undergo relative axial movement when expansion or contraction of the concrete slabs takes place. Also in the construction shown is a wire framework F for initial support of the joint assembly, and this may comprise a bowed stirrup 10 which underlies the spacer member (and the bottom seal B if applied thereto) and engages the outer sides of the two companion plates P, the stirrup then extending outwardly in opposite directions to provide feet 11 in connection with longitudinal stringers 12; and chairs 13 extending upwardly from the stringers and formed at their upper ends with seats 14 for support of the dowels near their ends. Such a supporting framework, including the dowels and companion bearing plates, is illustrated herein as a typical unit in a load transfer device that may advantageously be used with the installation of the present spacer-seal assembly.

The spacer member S is in the general form of a board. It may be of wood or of composition material having the capacity to compress or contract in response to opposing pressures transmitted by the adjacent slabs of concrete or the like. It is also resilient to a minor degree so as to expand slightly after the pressure has ceased. The thickness of such a spacer member may vary—½" or ¾" is a common dimension. The width of the board is such as to extend continuously between a bottom sealing strip B when rested on the subgrade C to a top sealing strip T when positioned nearly flush with the top surface of the slabs with which it is used.

The form and configuration of the top sealing strip T may vary within certain limits, four suggestive designs being illustrated herein. Each comprises a body having in its upper portion a central air chamber c which extends continuously for the length of the strip. Between its spaced vertical side walls 15 and 16 thus provided, there is a top connecting wall 17; there is also a pair of cross walls in the form of ledges 18 and 19 extending inwardly from the two side walls at a medial point vertically of the strip, these ledges substantially meeting to provide, in effect, a cross wall which forms a bottom for the chamber c. The narrow gap between the two ledges completes a bifurcation of the strip along its bottom where the disconnected side walls 15 and 16, in conjunction with the ledges 18 and 19, define a flat-top channel for receiving the top edge portion of the spacer member S.

The sealing strip in each of the forms shown is characterized also by a pair of flanges 21 and 22 which are laterally extended outwardly from the vertical side walls adjacent the bases thereof. These two flanges which are coextensive with the length of the strip are formed along their outer edges with continuously extended heads 24 and 25, each elongated vertically in cross section so as to extend abruptly both above and below the flanges. Heads of this configuration constitute anchoring keys and, when embedded within slabs of concrete or the like, will become firmly and securely interlocked therewith so as to remain permanently in place.

The features of construction just described are embodied in each of the forms of sealing strips herein illustrated. In Figs. 1, 3, and 4 the top wall 17 is formed with an upwardly facing longitudinal groove 27 and opposite thereto the same wall may be provided with a depending rib 28. The purpose here is to induce an inward deformation of the strip when compressive forces are exerted against its opposite walls which in the upper region are separated by air in the chamber c and therebelow by the compressible spacer member S. By the provision of the top groove 27, there will be an increased tendency for the top wall 17 to bow inwardly and downwardly when compression takes place, thus offering a minimum of resistance to expansive movement on the part of the slabs; also in such circumstances the ledges 18 and 19 will tend to move similarly due to the slab expansion and contraction being greatest in the region of its top surface. In any such movement there will be some relative vertical shifting of adjacent slabs (depending largely on the effectiveness of the load transfer devices used) with attendant abrasion on the sealing strips anchored therebetween, but this is not a factor of detriment since the compounds of which such strips may now be produced are highly resistant to abrasion in a degree which is ample for protection of the strips.

In Fig. 2 the outer faces of the side walls 15 and 16 diverge outwardly to acquire increased thickness toward their bases, and in addition they are fluted or grooved longitudinally at 29. Such an exterior configuration provides an interengagement between the strip and the adjacent slabs which will enhance resistance to relative vertical movement of the strip therebetween. A similar configuration of grooves 29 is also incorporated into the strip of Fig. 4 where, in addition, the divergence in the outer faces of the side walls 15 and 16 is confined to the upper region of the strip above the single pair of grooves 29 there shown, while therebelow these outer faces converge inwardly at 30. Likewise the same feature of advantage is present in the construction of Fig. 3 where the side walls 15 and 16, below the ledges 18 and 19, are outset, thus providing obliquely facing shoulders 31 for the same purpose.

In many installations the conditions are such that each joint should be protected by a bottom seal as well. Figs. 1 and 2 show bottom sealing strips B applied to the bottom edge portion of the spacer member for this purpose. Each such bottom seal may be rested upon the subgrade C, and since the illustrated constructions are substantially the same as the top sealing strips already described, the same reference characters are applied thereto to designate like parts. The positions of these bottom strips are inverted with respect to the top strips, hence such descriptive terms as "top wall" and "base" should be construed in a relative sense.

In the construction of a succession of slabs, such as are used for a pavement, the subgrade C is preliminarily completed, positioning of the forms and expansion joints following in due course. These joints, when made up of the components heretofore described, may be assembled on the job and be supported on the wire framework F which is rested on the subgrade. With the parts thus assembled and correctly positioned, the concrete may then be placed. Thereupon the wire framework, bearing plates, dowel pins, side plates and preformed sealing strips become firmly embedded in place.

In use, the joint of this invention will provide an effective seal which will prevent the entrance of weather between the confronting faces of concrete slabs. The position of the top seal is fixed by the vertical width of its supporting spacer member. The positions of the outwardly extended flanges and key-heads formed thereon is at a relatively low-down point vertically of the strip, and this assures locking of the heads within the adjacent concrete slabs at points sufficiently removed from the top faces thereof to obviate any liability of spalling, particularly when the confronting faces of the slabs at the joint are vertical, as occurs with the use of sealing strips as per Figure 1.

The bearing plates, together with the dowel pins supported thereby, will also serve effectively to transmit the load from one slab to the other when a vehicle crosses over the joint. In response to thermal changes, the concrete will tend to expand or contract, thereby placing the joint under a greater or lesser pressure. Due to the special construction hereinbefore described, the joint is free to contract without damage, since the spacer member and sealing strip are readily compressible or deformable, and resilient as well. The top sealing strip T will yield as the slabs approach each other, and due to its bifurcated character and to the provision of the air chamber in its body, its contracting value is measurably enhanced.

The air cushion sealing strip in the various forms herein disclosed is advantageous from several standpoints. It may come in long lengths so as to be readily severed into shorter lengths as required. Being preformed, the strip is adaptable for ready assembly with the associated parts. The sides of the strip may diverge outwardly toward the base, and may also be channeled or recessed lengthwise of itself, to provide effective contours with which the concrete may engage when pouring takes place, and even though the strip side walls are inwardly deformable their laterally extended heads remain keyed in place and so are positively prevented from working loose or outwardly from between the concrete slabs at the joint.

The joint assembly comprises in each case a resilient sealing strip which constitutes a continuous bridge extending transversely of the joint with its opposite edges fixedly anchored to the adjacent slabs of concrete. Whether these slabs move toward or from each other, these sealing strips remain locked in place, firmly in engagement with the adjacent faces of the joint, and effective to prevent ingress or infiltration of water, dirt, or foreign particles into the space between the slabs. These sealing strips, being resilient, may accordingly contract or expand independently of the spacer members which carry them. In this movement the spaced walls of the strips are, in effect, hinged at the top with capacity for free swinging movement toward or from each other, and the top wall which constitutes the hinge in such a structure is itself deformable inwardly into the air chamber so that any tendency for relative vertical movement by the strip is adequately resisted.

I claim:

1. In combination with a spacer member, a preformed resilient sealing strip supported thereon, said strip comprising a top wall having a longitudinal groove to promote hinge action, and side walls terminating in outwardly extending anchors below the top edge of said spacer member, each side wall having opposed supporting ledges spaced from said top wall and resting on the top of said spacer whereby an air chamber is formed above said spacer member in said sealing strip.

2. The combination of claim 1 wherein said side walls have their outer faces converging toward said top wall providing a tapered strip adapted to be retained between the subsequently poured concrete slabs by wedging action and providing faces over which a substantial amount of the stresses produced in use can be distributed.

3. The combination of claim 1 wherein said side walls have their outer faces converging toward said top wall providing a tapered strip adapted to be retained between the subsequently poured concrete slabs by wedging action and providing faces over which a substantial amount of the stresses produced in use can be distributed, said converging side walls having longitudinal grooves formed in the outside faces thereof.

JAMES H. JACOBSON.

REFERENCES CITED

The following references are of record in the file of this patent:

UNITED STATES PATENTS

| Number | Name | Date |
|---|---|---|
| 1,982,580 | Fischer | Nov. 27, 1934 |
| 2,139,465 | Robertson | Dec. 6, 1938 |
| 2,156,681 | Dewhirst et al. | May 2, 1939 |
| 2,172,773 | Robertson | Sept. 12, 1939 |
| 2,508,443 | Carter | May 23, 1950 |

FOREIGN PATENTS

| Number | Country | Date |
|---|---|---|
| 17,164 | Great Britain | 1914 |